United States Patent [19]
Jones et al.

[11] Patent Number: 5,894,077
[45] Date of Patent: Apr. 13, 1999

[54] RADIOACTIVE EFFLUENT TREATMENT

[75] Inventors: Christopher Peter Jones, Swindon; Paul Antony Harry Fennell, Didcot; Patrick Alan Fletcher, Swindon, all of United Kingdom

[73] Assignee: AEA Technology plc, Harwell, United Kingdom, GBX

[21] Appl. No.: 08/955,855

[22] Filed: Oct. 21, 1997

[30] Foreign Application Priority Data

Nov. 8, 1996 [GB] United Kingdom ............ 9623346
Mar. 20, 1997 [GB] United Kingdom ............ 9705812

[51] Int. Cl.⁶ .................. C02F 1/461; C25B 1/00; B01D 61/44
[52] U.S. Cl. .................. 588/204; 205/262; 205/560; 205/688; 205/702; 205/703; 205/770; 205/771
[58] Field of Search .................. 588/204; 205/43, 205/560, 688, 702, 703, 770, 771, 262

[56] References Cited

U.S. PATENT DOCUMENTS

| | | | |
|---|---|---|---|
| 3,679,557 | 7/1972 | Gilby | 204/97 |
| 4,226,685 | 10/1980 | Portal | 204/105 R |
| 4,278,521 | 7/1981 | Kreysa | 204/222 |
| 4,507,183 | 3/1985 | Thomas | 204/98 |
| 4,879,006 | 11/1989 | Turner | 205/543 |
| 5,306,399 | 4/1994 | Bradbury et al. | 205/555 |

FOREIGN PATENT DOCUMENTS

| | | |
|---|---|---|
| 1312681 | 4/1973 | United Kingdom . |
| 1598306 | 9/1981 | United Kingdom . |
| WO 95/07375 | 3/1995 | WIPO . |

*Primary Examiner*—Arun S. Phasge
*Attorney, Agent, or Firm*—William H. Holt

[57] ABSTRACT

A radioactive waste stream (12) is of high pH and contains a wide variety of different fission products and also organic materials which act as complexants. Technetium and/or ruthenium are removed by first electrolytically oxidising the organic materials at an anodically stable anode (26), and then electrolytically reducing the technetium and/or ruthenium at a porous fluid-permeable cathode (42). The cathode (42) might for example be of lead wool.

14 Claims, 1 Drawing Sheet

RADIOACTIVE EFFLUENT TREATMENT

The present invention relates to a process using electrolysis for treating an aqueous waste solution containing radioactive fission products, and particularly but not exclusively an alkaline solution which also contains organic materials.

The reprocessing of nuclear fuel generates a waste stream which contains a wide variety of fission products, predominantly of atomic number between 30 and 63, many of which are radioactive. The waste stream may also contain organic materials such as citrate ions, gluconate ions, ethylenediaminetetraacetic acid (EDTA) or nitrilotriacetic acid (NTA), and these may form complexes with some of the fission product ions. Processes such as flocculation, ultrafiltration, and ion exchange enable the bulk of the radioactive material to be removed from such a waste solution, but the elements technetium (Tc, atomic number 43) and ruthenium (Ru, atomic number 44) pose particular problems. A process for removing technetium is described by Carlin (U.S. Pat. No. 3,890,244) in which an acid waste stream is made alkaline so that many fission products precipitate; the supernatant liquid is acidified and electrolysed to deposit technetium on the cathode. Another process is described by Carlin et al. (U.S. 3,922,231) in which an aged alkaline supernatant waste liquid containing ruthenium and technetium (inter alia) is treated by anion exchange to remove these metals; these metals are eluted, the eluate acidified, and electrolysed to deposit the metals on the cathode. However there are many real wastes where neither of these processes has been found to be effective, possibly because of the complexing effect of organic molecules in solution.

According to the present invention there is provided a process for treating an alkaline radioactive waste solution containing a wide range of fission products so as to remove technetium and/or ruthenium, the process comprising electrolysing the alkaline solution using a porous liquid-permeable high surface area electrode as cathode, so the technetium and/or ruthenium deposits in an insoluble form.

The solution is at a pH above 11 for example between 11 and 14, or between 13 and 14. The cathode may be of carbon, for example a felt of carbon fibres, or more preferably of lead, for example lead wool.

The process may also comprise electrolysing the solution using an anode of a material anodically stable in alkaline solution, for example an electrically-conducting doped diamond, so as to oxidise organic materials present in the solution. This ensures that there are no organic materials to form complexes. As the organic materials are broken down transition metals will be released into the solution, and because of the high pH will form precipitates of oxides or hydroxides; it may be desirable to separate this precipitate from the remaining solution, for example by settling or by filtration, before subjecting the solution to the electrolysis with the liquid-permeable cathode. Hence this electrolytic oxidation may be performed as a preliminary stage, or may be performed in the same cell as the electrolytic deposition of technetium and/or ruthenium.

The porous cathode may be planar, or may be tubular for example as described in GB 1 598 306 (Kodak) or in WO 95/07375 (EA Technology). The solution may be caused to flow through the porous cathode, for example radially inwardly or outwardly if it is tubular. It may be beneficial to provide an anode, for example of platinum, close to the cathode (or two anodes at opposite faces of the cathode) such that the solution rapidly passes from an oxidising environment adjacent to the anode to a reducing environment adjacent to the cathode. The voltages preferably do not exceed the potential limits for oxygen and hydrogen evolution. In this case ruthenium will precipitate as ruthenium (IV) oxide, in a similar manner to that described in GB 2 208 518 B. Similarly technetium may precipitate either as technetium (IV) oxide or hydroxide, or as technetium metal, although the nature of the deposit onto a lead cathode is unclear. Where only technetium is to be precipitated only the cathode reactions are required, so a divided cell may be used.

It will be appreciated that such radioactive waste solutions contain a wide variety of different ions, many of which may be radioactive. Typically they might be up to about 10 M in sodium salts, for example about 4 or 5 molar $NaNO_3$, and also comprise caesium and strontium ions, and transition metals such as copper, chromium, or iron some of which may be in the form of oxyanions such as chromate, and precious metal ions such as platinum and rhodium, as well as ruthenium and technetium. The processes which occur during electrolysis are inevitably complex because of the wide range of ions present, many of which may interfere with the desired deposition.

A variety of materials are suitable for the anode used to oxidise organic materials, for example a metal substrate such as titanium may be coated with platinum, iridium oxide, doped tin oxide, or lanthanum cobaltate, nickelate, or manganate. Diamond may also be used, the diamond preferably being a film formed by chemical vapour deposition, and doped for example with boron to achieve sufficient conductivity. The use of such an electrode is described in U.S. Pat. No. 5,399,247 (Eastman Kodak/Carey et al.). The diamond film is typically of thickness between 3 µm and 1 mm, preferably between 10 µm and 100 µm. It forms a coating on a substrate which provides both mechanical support and a good electrical contact to the film. The substrate may be of silicon, or a metal such as titanium, tantalum or zirconium, which is believed to form an interfacial layer of a carbide between the substrate and the film which ensures adhesion. In use, the current density is typically in the range 10 µA/cm to 1 A/cm², for example 0.1 or 0.2 A/cm², and the resistance of the electrode should be low enough that there is little energy dissipated in Joule heating within the electrode.

BRIEF DESCRIPTION OF THE DRAWINGS

The invention will now be further described, by way of example only, and with reference to the accompanying drawings in which:

Referring to FIG. 1, a plant 10 is shown for treating a radioactive waste stream 12 to remove technetium and ruthenium. The waste stream in this example is of pH about 13, and comprises about 5M sodium nitrate as well as a wide variety of other metal ions, and organic compounds such as EDTA and citrate ions which form complexes with transition metals.

Figure 1:
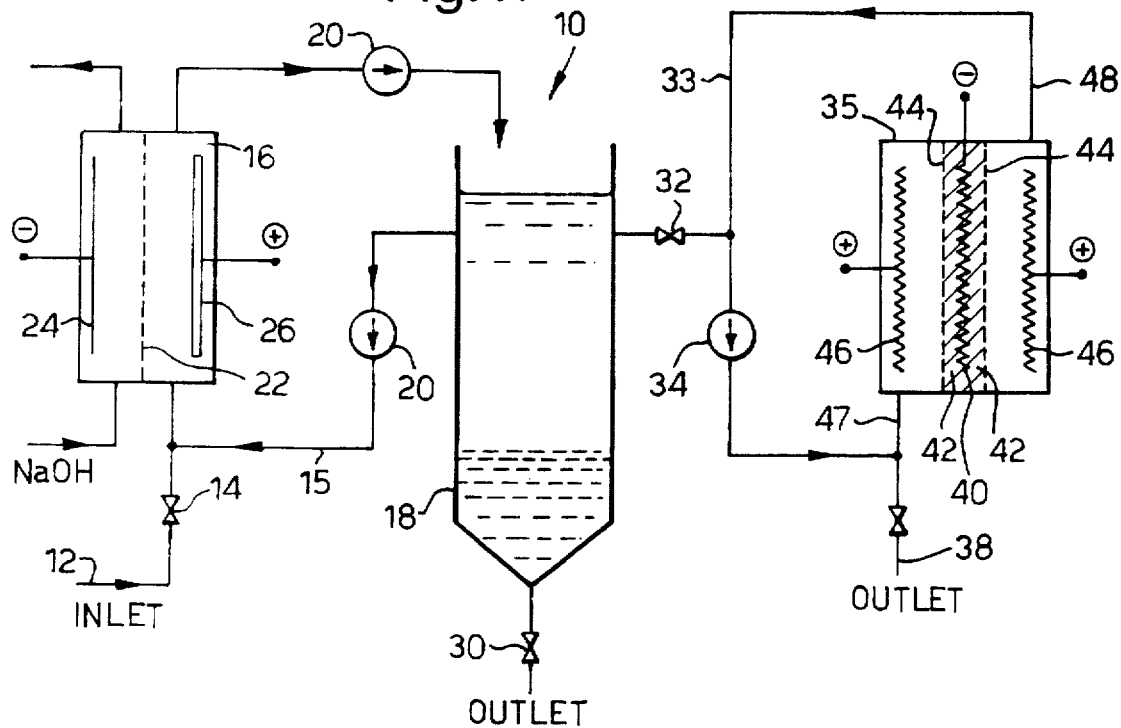
FIG. 1 shows a diagrammatic sectional view of a plant for removing technetium and ruthenium from a radioactive waste stream.

The waste stream 12 is supplied via a valved inlet 14 to a recirculating loop 15 comprising a divided cell 16 and a settling tank 18, and two circulating pumps 20. The cell 16 is divided by an anion-selective membrane 22 into a cathode compartment containing a platinised titanium electrode 24, and an anode compartment containing an electrically conducting boron-doped diamond electrode 26 on a silicon substrate. An electric power supply (not shown) is connected to contacts to the electrodes 24 and 26 such that the diamond electrode 26 is the anode, so that in operation an electric current of 100 mA/cm$^2$ of the electrode 26 is passed through the cell. The substrate of the electrode 26 is coated with electrically insulating lacquer so that only the diamond surface is exposed to the liquid. Sodium hydroxide solution is supplied to the cathode compartment, while the waste stream 12 flows through the anode compartment of the cell 16.

As the waste solution 12 passes through the cell 16 the voltage applied between the electrodes 24 and 26 is about 5 or 6V, and the organic materials are oxidised and broken down. Complexed transition metals are released into solution and precipitate as an oxide or hydroxide floc. The liquid is pumped to the settling tank 18, in which the floc tends to sediment out; an outlet valve 30 enables settled floc to be withdrawn. Supernatant liquid from near the top of the tank 18 is recirculated via pump 20 to the cell 16.

A valved outlet port 32 near the top of the tank 18 enables supernatant liquid to be transferred to a second recirculating loop 33 including a pump 34 and an electrolysis cell 35. A valved outlet duct 38 enables treated liquid to be withdrawn from the loop 33. The cell 35 has a central cathode region with a perforated electrode 40 of platinised titanium sandwiched between two sheets 42 of carbon fibre felt each 10 mm thick, with a nylon mesh support 44 at the outer surface of each felt sheet 42. On either side of this central region is an anode region in which is a platinised titanium electrode 46, and a power supply (not shown) is connected to the electrodes 40 and 46 so the former is a cathode and the latter are anodes. The inlet and outlet ports 47, 48 of the cell 35 communicate with anode regions at opposite sides of the central cathode region, so the radioactive liquid flows through the two felt sheets 42.

In operation the liquid is pumped rapidly around the loop 33 and through the cell 35, so the flow velocity through the felt sheets 42 is between 0.25 m/s and 1.5 m/s. The potential difference between the cell electrodes 40 and 46 is preferably such that gases are not generated by electrolysis, although in some cases gases may be evolved at one or other electrode. The power supply is preferably one which provides a constant voltage; and the voltage of the cathode 40, 42 is preferably about −1.0 V relative to a saturated calomel electrode. Technetium is deposited in the felt cathode sheets 42 as a solid, possibly as a mixture of hydroxide and oxide. Ruthenium may also deposit directly onto the cathode sheets, but more often it is initially present in the form of the nitroso-complex Ru(NO)$^{3+}$ which does not undergo electrolysis at the cathode. In this case the complex ions are first oxidised at the anode 46 to RuO$_4$; this remains in solution until it reaches the cathodic felt sheets 42 where it is electrochemically reduced to RuO$_2$.nH$_2$O which is a black solid precipitate.

Figure 2:
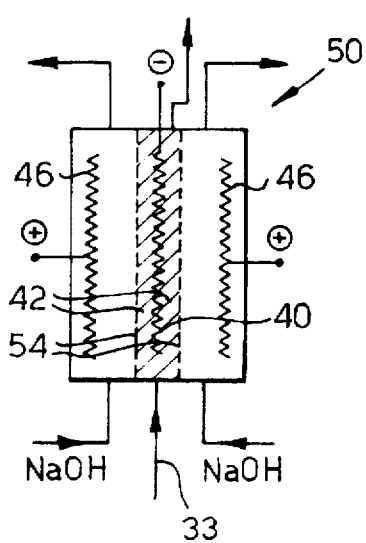
FIG. 2 shows a diagrammatic sectional view of an alternative electrolytic cell for use in the plant of FIG. 1.

Referring now to FIG. 2 there is shown a modification to the cell 35 of FIG. 1 suitable for use where ruthenium complexes are not present. The cell 50 of FIG. 2 has two anode regions containing electrodes 46, at either side of a central cathode region with an electrode 40 sandwiched between two sheets 42 of carbon felt; it differs from the cell 35 in that the nylon mesh supports 44 are replaced by cation-selective membranes 54. Sodium hydroxide solution is circulated through the two anode regions, whereas the loop 33 is connected only to ports at opposite ends of the cathode region. The cell 50 operates in the same way as the cell 35 as regards technetium, which is consequently deposited in the felt sheets.

Figure 3:
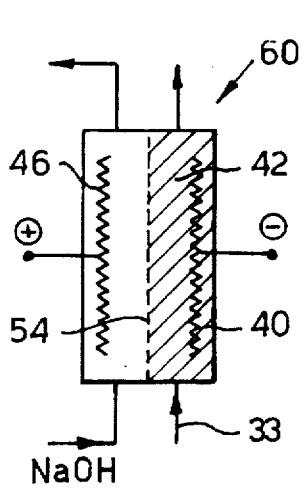
FIG. 3 shows a diagrammatic sectional view of another alternative electrolytic cell for use in the plant of FIG. 1.

The cells 35 and 50 both have two anode regions either side of a cathode region. Alternatively, as shown in FIG. 3, a cell 60 which may be used in the loop 33 has a single anode 46, and a cathode 40 with a single sheet 42 of carbon felt. The anode region is separated from the cathode region by a cation-selective membrane 54. As with the cell 50 of FIG. 2, an electrolyte such as sodium hydroxide solution is circulated through the anode region, while the liquid in the loop 33 is circulated through the cathode region.

Figure 4:
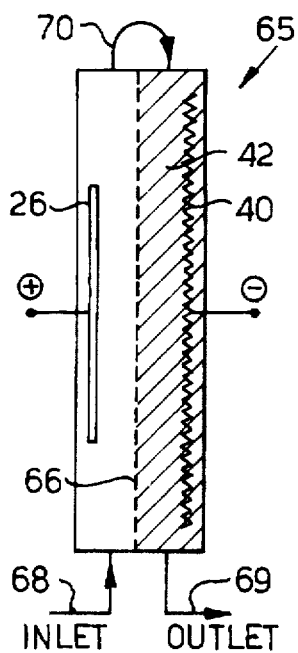
FIG. 4 shows a diagrammatic sectional view of an alternative plant for removing technetium from a radioactive waste stream.

Referring now to FIG. 4 there is shown a cell 65 for removing technetium from a radioactive waste stream 68. The cell 65 is a divided cell with an anion-selective membrane 66 dividing it into an anode compartment in which is a diamond electrode 26, and a cathode compartment in which is a sheet 42 of carbon fibre felt on a platinised titanium electrode 40. The radioactive waste solution 68 is supplied to one end of the anode compartment and treated solution 69 emerges from that end of the cathode compartment; a duct 70 connects the anode and cathode compartments at the other end. The electrodes 26 and 40 are connected to a suitable power supply (not shown) and the arrangement is such that at the anode 26 the current density is about 200 mA/cm$^2$, and that the voltage of the cathode 40, as previously discussed, is preferably such that gas evolution does not occur.

In operation, as the waste stream 68 flows past the anode 26 the organic materials in it are oxidised and break down. This destroys the complexing agents. As the stream then flows through the cathode compartment any technetium will be deposited onto the carbon felt. It will be appreciated that ruthenium may also be deposited by the same mechanism as discussed above, the nitroso complex being oxidised at the anode 26 and then reduced at the cathode, unless the flow path (duct 70) is so long that the nitroso complex reforms. It will also be appreciated that the cell 65 is not suitable if the waste stream 68 contains large quantities of complexed transition metals, as these will form a floc as the organic materials are oxidised which would tend to block the pores in the carbon felt 42. As with the apparatus of FIG. 1, the stream 68 might be recirculated around the cell 65 several times before being discharged.

It will be understood that the apparatuses described above can be modified in a variety of ways while remaining within the scope of the invention. For example the carbon felt sheets 42 might be replaced by an integral fibrous structure comprising carbon fibres bonded together at their points of contact; such a structure may be made from carbonisable fibres by use of a latent solvent, that is to say a solvent which dissolves the fibres only when activated for example when the temperature is raised, as described in GB 1 600 253. This provides a more uniform electrical potential throughout the sheet because it ensures better electrical contact between the fibres.

The diamond electrodes 26 used for anodic oxidation of organic materials in the cells 16 and 65 might be replaced by electrodes of another material which is stable under these electrochemical conditions. One such material is platinised titanium. The carbon fibre felt sheets 42 might also be replaced by porous sheets of another material. Indeed if the waste stream 12 contains chromium in the form of chromate anions, it has been found that the deposition of technetium onto the cathodic carbon fibre felt sheets 42 (in the cells 35, 50, 60 or 65) is very considerably inhibited. This is also the case with porous cathodes of several other materials such as tin, nickel, titanium or copper. If however the carbon fibre sheets 42 are replaced by permeable sheets of lead wool the deposition of technetium is effective. For example with a waste stream containing both organic material and chromate ions there was no deposition of technetium onto a carbon felt cathode; with a lead wool cathode a decontamination factor (DF) for technetium of about 5 was obtained even without first oxidising the organics; and if the pre-oxidation of organics was carried out then the DF for technetium was between 100 and 200.

It should also be appreciated that the cells 16 and 35, 50, 60 and 65 can be operated in a constant current mode, or at constant cell voltage, or with a constant potential of one electrode relative to a reference electrode. The cell 65 of FIG. 4, without the duct 70, might be used in place of both the cells 16 and 35 of FIG. 1, by firstly circulating the waste stream 12 via a loop 15 through the anode compartment of the cell 65, and then circulating the oxidised waste stream 33 through the cathode compartment of the cell 65. An alternative to the cell 65 of FIG. 4, suitable for use with similar waste streams, resembles the cell 35 of FIG. 1 except that the anodes 46 are both replaced by diamond anodes 26. An untreated waste stream 68 is supplied to one anode compartment, and then flows through the mesh supports 44 and the central cathode compartment 42, 40 to the other anode compartment; the waste stream may be recirculated.

The high surface area fibrous cathodic sheet, whether or carbon or of lead, contains technetium in a solid form (which might be metal, oxide, or insoluble salt). The technetium can be removed from the sheet for example by dissolution into dilute nitric acid. If the waste stream 12 had contained chromate ions and deposition had been onto lead wool, then the solution obtained with dilute nitric acid will contain pertechnetate ions, plumbous ions and chromic ions. This solution is desirably then subjected to electrodialysis by supplying it to a central compartment separated by an anion-selective membrane from an anode compartment, and by a cation-selective membrane from an cathode compartment, so the plumbous and chromic ions pass into the cathode compartment whereas the pertechnetate ions pass into the anode compartment.

The dissolution into nitric acid can be assisted by the application of an anodic potential or by the use of a suitable oxidising agent such as hydrogen peroxide. However, if chromium is present this is inadvisable, as chromate ions will be generated which cannot be separated by electrodialysis from the pertechnetate ions.

We claim:

1. A process for treating an alkaline radioactive waste solution containing a wide range of fission products so as to remove technetium, the process comprising electrolysing the alkaline solution using a porous liquid-permeable high surface area electrode as cathode, so that technetium deposits in an insoluble form, further including the steps of dissolving technetium from the high surface area cathode, and subjecting the resulting solution to electrodialysis to separate pertechnetate ions from any cations.

2. A process as claimed in claim 1 wherein the cathode comprises lead.

3. A process as claimed in claim 1 also comprising electrolysing the solution using an anode of a material anodically stable in alkaline solution, so as to oxidise organic materials present in the solution, before electrolysing with the high surface area cathode.

4. A process as claimed in claim 3 also comprising separating a precipitate from the alkaline solution, after the anodic oxidation and before electrolysing with the high surface area cathode.

5. A process as claimed in claim 4 wherein separating the precipitate is performed by leaving the precipitate to settle.

6. A process as claimed in claim 1 also comprising electrolysing the solution using an anode of a material anodically stable in alkaline solution, so as to oxidise organic materials present in the solution, in the same cell in which the solution is electrolysed with the high surface area cathode.

7. A process as claimed in claim 1 wherein the high surface area cathode is sufficiently close to at least one anode that the solution passes rapidly from an oxidising environment adjacent to the anode to a reducing environment adjacent to the cathode.

8. A process as claimed in claim 1 wherein the high surface area cathode is separated from an anode by an ion-selective membrane.

9. A process for treating an alkaline radioactive waste solution containing fission products including technetium so as to remove said technetium, said process comprising the steps of providing a porous liquid permeable high surface area electrode of lead wool as cathode, and electrolysing said alkaline solution to deposit technetium in insoluble form.

10. A process as defined in claim 9 including the step of providing a divided cell with an ion-permeable membrane to separate anolyte from catholyte to keep the anolyte and catholyte separate before and after the step of electrolysing said alkaline solution.

11. A process as defined in claim 9 including the further step of pre-treating said alkaline solution prior to the step of electrolysis using an anode of a material anodically stable in alkaline solution to oxidize organic materials present in said solution, and then separating a precipitate from said alkaline solution.

12. A process as defined in claim 11 further comprising the subsequent steps of dissolving technetium from the said high surface area lead wool cathode, and subjecting the resulting solution to electrodialysis to separate pertechnetate ions from any cations.

13. A process for treating an alkaline radioactive waste solution containing organic materials and fission products including technetium in solution, said process comprising the steps of electrolysing said solution using an anode of a material anodically stable in alkaline solution so as to oxidize organic materials present in said solution, then separating a precipitate from said alkaline solution, and then electrolyzing said alkaline solution as catholyte using a porous liquid-permeable high surface area electrode as cathode, so that technetium deposits at said cathode in an insoluble form.

14. A process as defined in claim 13 including the step of forming said cathode from lead.

* * * * *